(12) United States Patent
Feng et al.

(10) Patent No.: US 10,697,281 B2
(45) Date of Patent: Jun. 30, 2020

(54) LARGE-SCALE THREE-DIMENSIONAL PHYSICAL MODEL TEST SYSTEM AND METHOD FOR DEEP CAVERN GROUP

(71) Applicant: Northeastern University, Shenyang, Liaoning Province (CN)

(72) Inventors: Xiating Feng, Shenyang (CN); Zhengwei Li, Shenyang (CN); Xiwei Zhang, Shenyang (CN); Jun Tian, Shenyang (CN); Chengxiang Yang, Shenyang (CN); Zhibin Yao, Shenyang (CN); Qiang Wang, Shenyang (CN); Yanhua Gong, Shenyang (CN)

(73) Assignee: NORTHEASTERN UNIVERSITY, Shenyang, Liaoning Province (CN)

( * ) Notice: Subject to any disclaimer, the term of this patent is extended or adjusted under 35 U.S.C. 154(b) by 223 days.

(21) Appl. No.: 16/061,799

(22) PCT Filed: Feb. 12, 2018

(86) PCT No.: PCT/CN2018/076379
§ 371 (c)(1),
(2) Date: Jun. 13, 2018

(87) PCT Pub. No.: WO2019/148547
PCT Pub. Date: Aug. 8, 2019

(65) Prior Publication Data
US 2019/0242228 A1 Aug. 8, 2019

(30) Foreign Application Priority Data
Feb. 2, 2018 (CN) .......................... 2018 1 0106439

(51) Int. Cl.
*E21B 43/26* (2006.01)
*F04B 51/00* (2006.01)

(52) U.S. Cl.
CPC .............. *E21B 43/26* (2013.01); *F04B 51/00* (2013.01)

(58) Field of Classification Search
CPC ................................. E21B 43/26; F04B 51/00
See application file for complete search history.

(56) References Cited

U.S. PATENT DOCUMENTS

| 5,025,668 A | * | 6/1991 | Sarda | ....................... G01N 3/10 |
| | | | | 73/795 |
| 10,197,483 B2 | * | 2/2019 | Du | ........................... G01N 3/24 |
| 2018/0275034 A1 | * | 9/2018 | Feng | ....................... G01M 7/08 |

FOREIGN PATENT DOCUMENTS

| CN | 101344445 A | | 1/2009 |
| CN | 101458192 | * | 6/2009 |

(Continued)

OTHER PUBLICATIONS

Xiwei, et al., "Study on Key Technology in Development of True Triaxial Apparatus to Determine Stress-Strain Curve for Hard Rocks", Key Laboratory of Ministry of Education for Safe Mining of Deep Metal Mines, Northeastern University, Shenyang 110819, China, 2017, 26 pages.

*Primary Examiner* — John Fitzgerald
(74) *Attorney, Agent, or Firm* — Muncy, Geissler, Olds & Lowe, P.C.

(57) ABSTRACT

A large-scale three-dimensional physical model test system for a deep cavern group comprises a base, an anti-deformation prestressed loading frame assembly, a load applying assembly, a model sample preparation and transportation assembly and a multifunctional hydraulic loading system assembly. The anti-deformation prestressed loading frame assembly and the model sample preparation and transportation assembly are both arranged on the base. The load applying assembly is arranged on the anti-deformation prestressed loading frame assembly, and the load applying (Continued)

assembly is connected with the multifunctional hydraulic loading system assembly. A model sample is subjected to long-time load holding, dynamic disturbance and displacement control overload under multi-surface multi-point cooperative control through cooperation between the load applying assembly and the multifunctional hydraulic loading system assembly.

8 Claims, 9 Drawing Sheets

(56) References Cited

FOREIGN PATENT DOCUMENTS

| | | | |
|---|---|---|---|
| CN | 106018104 A | | 10/2016 |
| CN | 106198264 | * | 12/2016 |
| CN | 107014690 A | | 8/2017 |

* cited by examiner

LARGE-SCALE THREE-DIMENSIONAL PHYSICAL MODEL TEST SYSTEM AND METHOD FOR DEEP CAVERN GROUP

BACKGROUND OF THE INVENTION

1. Field of the Invention

The present invention belongs to the technical field of large-scale three-dimensional physical model tests, and particularly relates to a large-scale three-dimensional physical model test system and method for a deep cavern group.

2. The Prior Arts

The large-scale three-dimensional physical model test is based on a similarity theory. The evolving mechanism for deformation and fracture of rock mass under the influence of human engineering activities can be effectively revealed by configuring artificial model materials similar to engineering rock mass in properties and carrying out excavation and monitoring tests under different boundary loading conditions.

Currently, the large-scale three-dimensional physical model test has been widely applied. However, the scale and the complexity of deep cavern groups are continuously increased as continuous deepened operation of underground engineering construction and resource exploitation, and the technical requirements for a large-scale three-dimensional physical model test are increasingly high in scientific research and engineering applications.

As continuous increase in dimensions of artificial models and test machine-loaded tonnage, and particularly continuous enhancement of the strength of artificial model materials, the counterforce frame structure of a conventional three-dimensional physical model test machine cannot effectively control the self-deformation of the test machine in the loading process. Because the preparation and loading of the artificial model are carried out in the same box, the preparation precision of the artificial model cannot be measured. The conventional three-dimensional physical model test machine does not possess the ability of long-time load holding, so that artificial model research in terms of time-dependent characteristics of fracture under multiple stress gradients cannot be performed. The conventional three-dimensional physical model test machine does not possess the ability of high-precision displacement control loading, and further limits the ability to research the post-peak mechanical behavior of the artificial model, so that a load-displacement curve for the whole loading process cannot be obtained. The conventional three-dimensional physical model test machine does not possess the ability of simulating external dynamic disturbance, the process that deep engineering rock mass is affected by combined action of dynamic disturbance such as excavation unloading, blasting, and mechanical vibration cannot be simulated completely.

Therefore, it is imperative to research and develop a large-scale three-dimensional physical model test system and method for the deep cavern group aiming at the problems of deep engineering rock mass mechanics.

SUMMARY OF THE INVENTION

Aiming at the problems existing in the prior art, the present invention provides a large-scale three-dimensional physical model test system and method for a deep cavern group. A newly designed prestressed frame structure is adopted, the self-deformation of test equipment in the loading process can be effectively controlled, and the reliability of test data is improved; a preparation and transportation mechanism for an artificial model sample is arranged for the first time, the preparation area and the loading area of the artificial model sample are effectively separated, the requirement for the precision detection of the artificial model sample in the preparation stage is met, and influence of low preparation precision of the artificial model sample on test data is avoided; and the long-time load holding ability, the external dynamic disturbance simulating ability and the displacement control overload ability under multi-faced multi-point cooperative control are provided for the first time.

In order to realize the purpose, a large-scale three-dimensional physical model test system for deep cavern group is characterized by comprising a base, an anti-deformation prestressed loading frame assembly, a load applying assembly, a model sample preparation and transportation assembly and a multifunctional hydraulic loading system assembly, wherein the anti-deformation prestressed loading frame assembly and the model sample preparation and transportation assembly are both arranged on the base, the load applying assembly is arranged on the anti-deformation prestressed loading frame assembly, wherein the load applying assembly is connected with the multifunctional hydraulic loading system assembly, and wherein a model sample is subjected to long-time load holding, dynamic disturbance or displacement control overload under multi-surface multi-point cooperative control through cooperation between the load applying assembly and the multifunctional hydraulic loading system assembly.

The anti-deformation prestressed loading frame assembly comprises a middle frame, a front-end frame and a rear-end frame, wherein the middle frame is located between the front-end frame and the rear-end frame.

The middle frame adopts a multi-truss type rectangle-shaped structure, the middle frame of each truss consists of a top cross beam, a left pillar, a right pillar and a bottom cross beam, and the middle frames of any two adjacent trusses can be connected through a removable structure, wherein middle frame slide blocks are mounted on a lower surface of the bottom cross beam, frame guide rails are mounted on an upper surface of the base, and the middle frame has linear translation degree-of-freedom on the frame guide rails through the middle frame slide blocks; and a rectangle-shaped cavity of the middle frame is a model sample loading cavity.

The front-end frame comprises a left reaction vertical beam, a right reaction vertical beam, a reaction cross beam and reaction cross beam support seats, wherein the left reaction vertical beam and the right reaction vertical beam are symmetrically and fixedly mounted on the reaction cross beam, the reaction cross beam support seats are fixedly connected to a lower surface of the reaction cross beam, front-end frame slide blocks are mounted on lower surfaces of the reaction cross beam support seats, and the front-end frame has linear translation degree-of-freedom on the frame guide rails through the front-end frame slide blocks; a through hole is formed in a middle beam body of the reaction cross beam, the through hole acts as a model sample excavation hole, and the model sample excavation hole is directly opposite to the model sample loading cavity; front-end frame driving hydraulic cylinders are connected between a bottom end of the left reaction vertical beam and the base as well as between a bottom end of the right reaction vertical beam and the base, and the front-end frame driving hydraulic cylinders are parallel to the frame guide rails.

The rear-end frame comprises a left support vertical beam, a right support vertical beam, a support cross beam and support cross beam support seats, wherein the left support vertical beam and the right support vertical beam are symmetrically and fixedly mounted on the support cross beam, the support cross beam support seats are fixedly connected to a lower surface of the support cross beam, rear-end frame slide blocks are mounted on lower surfaces of the support cross beam support seats, and the rear-end frame has linear translation degree-of-freedom on the frame guide rails through the rear-end frame slide blocks; middle-and-rear-end frame driving hydraulic cylinders are connected between a bottom end of the left support vertical beam and the bottom cross beam of the middle frame as well as between a bottom end of the right support vertical beam and the bottom cross beam of the middle frame, and the middle-and-rear-end frame driving hydraulic cylinders are parallel to the frame guide rails.

The left reaction vertical beam and the left support vertical beam are connected through prestressed pull rods, the right reaction vertical beam and the right support vertical beam are connected through the prestressed pull rods, the reaction cross beam and the support cross beam are connected through the prestressed pull rods, and pull rod passing holes are respectively formed in the top cross beam, the left pillar, the right pillar and the bottom cross beam; and pretightening force is applied to the prestressed pull rods to realize prestressing locking among the middle frame, the front-end frame and the rear-end frame.

The load applying assembly comprises a first horizontal actuator group, a second horizontal actuator group, a third horizontal actuator group and a vertical actuator group, wherein the first horizontal actuator group is arranged on an inner side surface of the left pillar of the middle frame, the second horizontal actuator group is arranged on an inner side surface of the right pillar of the middle frame, the third horizontal actuator group is arranged on an inner side surface of the support cross beam of the rear-end frame, and the vertical actuator group is arranged on a lower surface of the top cross beam of the middle frame; a plurality of uniformly-distributed single actuators adopting the same structure are respectively arranged in the first horizontal actuator group, the second horizontal actuator group, the third horizontal actuator group and the vertical actuator group; each of the single actuators comprises a reaction hydraulic cylinder, a rectangular loading plate and a magnetostrictive displacement sensor; the reaction hydraulic cylinder is fixedly connected to the frame through a cylinder barrel, the rectangular loading plate is vertically and fixedly mounted at a top end of a piston rod of the reaction hydraulic cylinder, and an acoustic emission probe arranging hole is formed in the rectangular loading plate; and the magnetostrictive displacement sensor is connected between the cylinder barrel of the reaction hydraulic cylinder and the rectangular loading plate.

The model sample preparation and transportation assembly comprises a model sample preparation box, a model sample bearing platform, a model sample transportation rack, transportation rack driving hydraulic cylinders and bearing platform driving hydraulic cylinders, wherein transportation rack guide rails are mounted on the upper surface of the base, the transportation rack guide rails and the frame guide rails are perpendicular to each other, a mounting height of the transportation rack guide rails is greater than that of the frame guide rails, and the transportation rack guide rails at the junctions with the frame guide rails adopt a removable splicing structure; transportation rack slide blocks are mounted on a lower surface of the model sample transportation rack, and the model sample transportation rack has linear translation degree-of-freedom on the transportation rack guide rails through the transportation rack slide blocks; the model sample bearing platform is arranged on the model sample transportation rack, bearing platform guide rails are mounted on an upper surface of the model sample transportation rack, bearing platform wheels are mounted on a lower surface of the model sample bearing platform, and the model sample bearing platform has linear translation degree-of-freedom on the bearing platform guide rails through the bearing platform wheels; bearing platform adapting guide rails are mounted on an upper surface of the bottom cross beam in the model sample loading cavity of the middle frame, and the model sample bearing platform has linear translation degree-of-freedom on the bearing platform guide rails through the bearing platform wheels; the transportation rack driving hydraulic cylinders are connected between the base and the model sample transportation rack, and the transportation rack driving hydraulic cylinders are parallel to the transportation rack guide rails; the bearing platform driving hydraulic cylinders are connected between the model sample transportation rack and the model sample bearing platform, and are parallel to the bearing platform guide rails and the bearing platform adapting guide rails, and piston rods of the bearing platform driving hydraulic cylinders are connected with the model sample bearing platform through locks; and the model sample preparation box is located on an upper surface of the model sample bearing platform.

The multifunctional hydraulic loading system assembly comprises a computer, a controller, a static loading oil source, a dynamic loading oil source, a static loading oil distributor, a dynamic loading oil distributor, one or more static loading oil lines and one or more dynamic loading oil lines, wherein the computer is connected with the controller, the controller is separately connected with the static loading oil source and the dynamic loading oil source respectively, the static loading oil source is connected with one or more static loading oil lines through the static loading oil distributor, and the dynamic loading oil source is connected with one or more dynamic loading oil lines through the dynamic loading oil distributor.

Each of the static loading oil lines comprises a first electro-hydraulic servo valve, a first electromagnetic shutoff valve and a second electromagnetic shutoff valve, wherein a first oil inlet of the first electro-hydraulic servo valve is connected with the static loading oil distributor, one or more single actuators are connected in parallel between a first oil outlet and a second oil inlet of the first electro-hydraulic servo valve, and a second oil outlet of the first electro-hydraulic servo valve is connected with the static loading oil source; the first electromagnetic shutoff valve is mounted on a pipeline between the first oil outlet of the first electro-hydraulic servo valve and the single actuator, and the second electromagnetic shutoff valve is mounted on a pipeline between the second oil inlet of the first electro-hydraulic servo valve and the single actuator; a static-load pressure-stabilizing oil line and a static-pressure load-holding oil line are connected in parallel to a pipeline between the first electromagnetic shutoff valve and the single actuator; the static-load pressure-stabilizing oil line comprises a first energy accumulator and a third electromagnetic shutoff valve, wherein the first energy accumulator is connected with the single actuator through the third electromagnetic shutoff valve, and a first pressure sensor is mounted on a pipeline between the third electromagnetic shutoff valve and the single actuator; the static-pressure load-holding oil line comprises a load holding gas source, a gas-liquid booster pump, a fourth electromagnetic shutoff valve and a one-way valve, wherein the load holding gas source is connected with the gas-liquid booster pump, the gas-liquid booster pump is connected with a liquid inlet end of the one-way valve through the fourth electromagnetic shutoff valve, and a liquid outlet end of the one-way valve is connected with the single actuator; a second pressure sensor is mounted on a pipeline between the second electromagnetic shutoff valve and the single actuator.

Each of the dynamic loading oil lines comprises a second electro-hydraulic servo valve, a fifth electromagnetic shutoff valve, a sixth electromagnetic shutoff valve and a seventh electromagnetic shutoff valve, wherein a first oil inlet of the second electro-hydraulic servo valve is connected with the dynamic loading oil distributor, one or more single actuators are connected in parallel between a first oil outlet and a second oil inlet of the second electro-hydraulic servo valve, and the second oil outlet of the first electro-hydraulic servo valve is connected with the dynamic loading oil source; the fifth electromagnetic shutoff valve is mounted on a pipeline between the first oil outlet of the second electro-hydraulic servo valve and the single actuator, and the sixth electromagnetic shutoff valve is mounted on a pipeline between the second oil inlet of the second electro-hydraulic servo valve and the single actuator; the seventh electromagnetic shutoff valve is separately connected between the single actuator and the dynamic loading oil source; a dynamic-load pressure-stabilizing oil line is connected to a pipeline between the fifth electromagnetic shutoff valve and the single actuator; the dynamic-load pressure-stabilizing oil line comprises a second energy accumulator and an eighth electromagnetic shutoff valve, wherein the second energy accumulator is connected with the single actuator through the eighth electromagnetic shutoff valve, and a third pressure sensor is mounted on a pipeline between the eighth electromagnetic shutoff valve and the single actuator; and a fourth pressure sensor is mounted on a pipeline between the sixth electromagnetic shutoff valve and the single actuator.

A large-scale three-dimensional physical model test method for a deep cavern group adopts a large-scale three-dimensional physical model test system for a deep cavern group and comprises the following steps of:

Step I: selecting a material according to test requirements, preparing a model sample from the material in a model sample preparation box, and pre-embedding monitoring sensors in the model sample;

Step II: demolding the model sample after the model sample reaches initial strength, and besides, detecting flatness, perpendicularity and compactness of the model sample to make sure all indicators of the model sample are qualified;

Step III: firstly, moving a model sample transportation rack to a position right ahead a model sample loading cavity, then moving a model sample bearing platform into the model sample loading cavity so that the model sample enters the model sample loading cavity along with the model sample bearing platform, releasing the locking between the model sample bearing platform and the model sample transportation rack, and finally, moving the model sample transportation rack back to an initial position;

Step IV: adjusting the anti-deformation prestressed loading frame assembly from open state to closed state so that a middle frame, a front-end frame and a rear-end frame form a whole;

Step V: respectively controlling the actions of a first horizontal actuator group, a second horizontal actuator group, a third horizontal actuator group and a vertical actuator group until the accurate centering and clamping of the model sample is completed;

Step VI: controlling the first horizontal actuator group, the second horizontal actuator group, the third horizontal actuator group and the vertical actuator group to apply true triaxial static loading to the model sample in a multi-face multi-point cooperative displacement control mode, then excavating the model sample under a set static loading level, and besides, observing a deformation fracture evolution condition of the model sample;

Step VII: after excavation is completed, switching the loading state to the long-time load holding state, overload state or dynamic disturbance state according to test requirements, observing a failure fracture evolution condition of the model sample in the long-time load holding state, and observing the deformation fracture evolution condition of the model sample in the overload state or dynamic disturbance state;

Step VIII: separately controlling the actions of the first horizontal actuator group, the second horizontal actuator group, the third horizontal actuator group and the vertical actuator group until the unloading of the model sample is completed; and Step IX: first, moving the model sample transportation rack to a position right ahead the model sample loading cavity, then locking the model sample bearing platform and the model sample transportation rack, moving the model sample bearing platform from the model sample loading cavity to the model sample transportation rack, finally moving the model sample transportation rack back to the initial position, and performing further analysis study on the taken-out model sample.

The control steps of long-time load holding are as follows:

Step 1: setting a static load value for each loading surface of the model sample in the computer, wherein all the static load values output by single actuators in each loading surface are the same or not the same;

Step 2: opening a first electromagnetic shutoff valve and a second electromagnetic shutoff valve in a static loading oil line, opening a third electromagnetic shutoff valve in a static-load pressure-stabilizing oil line, and closing a fourth electromagnetic shutoff valve in a static-pressure load-holding oil line;

Step 3: starting a static loading oil source, and performing static loading on the model sample according to a set static load value, wherein when instantaneous pressure in the static loading oil line is increased, pressure energy can be stored in the first energy accumulator in the form of compression energy; and when instantaneous pressure in the static loading oil line is reduced, the compression energy in a first energy accumulator can be supplemented to the static loading oil line to guarantee that pressure in the static loading oil line is stable;

Step 4: after the static loading reaches a set value, closing the first electromagnetic shutoff valve and the second electromagnetic shutoff valve in the static loading oil line, closing the third electromagnetic shutoff valve in the static-load pressure-stabilizing oil line, and opening the fourth electromagnetic shutoff valve in the static-pressure load-holding oil line; and Step 5: closing the static loading oil source, and starting a pressure holding mode, wherein with increase in loading time, when the pressure in the static loading oil line is reduced to be the set value or below, a gas-liquid booster pump in the static-pressure load-holding oil line is started, lost oil pressure is supplemented to the static loading oil line through the gas-liquid booster pump until the pressure is restored to the set value, and at the moment, the gas-liquid booster pump is closed.

The control steps of dynamic disturbance are as follows:

Step 1: setting a static load value for each loading surface of the model sample in the computer, wherein all the static load values output by single actuators in each loading surface are the same or not the same;

Step 2: opening a first electromagnetic shutoff valve and a second electromagnetic shutoff valve in a static loading oil line, opening a third electromagnetic shutoff valve in a static-load pressure-stabilizing oil line, and closing a fourth electromagnetic shutoff valve in a static-pressure load-holding oil line;

Step 3: starting a static loading oil source, and performing static loading on the model sample according to the set static load value, wherein when instantaneous pressure in the static loading oil line is increased, pressure energy can be stored in a first energy accumulator in the form of compression energy; and when instantaneous pressure in the static loading oil line is reduced, the compression energy in the first energy accumulator can be supplemented to the static loading oil line to guarantee that pressure in the static loading oil line is stable;

Step 4: selecting one or more loading faces as dynamic disturbance faces, and setting an amplitude and a frequency of dynamic load in the computer, wherein all the amplitude and all the frequency of the dynamic load output by each single actuator in the dynamic disturbance faces are the same or not the same;

Step 5: opening a fifth electromagnetic shutoff valve, a sixth electromagnetic shutoff valve and a seventh electromagnetic shutoff valve in a dynamic loading oil line, and opening an eighth electromagnetic shutoff valve in a dynamic-load pressure-stabilizing oil line; and Step 6: starting the dynamic loading oil source, and starting a second electro-hydraulic servo valve in the dynamic loading oil line so that the valve element of the second electro-hydraulic servo valve makes high-frequency reciprocating motion, then a reaction hydraulic cylinder in the single actuator completes high-frequency oil supply and oil return, and the model sample is subjected to dynamic disturbance according to the set dynamic load, wherein during dynamic disturbance, when pressure fluctuates in the dynamic loading oil line, pressure is saved and released through a second energy accumulator to guarantee that pressure of the dynamic loading oil line is stable.

The control steps of multi-surface multi-point cooperative displacement are as follows:

Step 1: setting a displacement loading rate of single actuators in each loading surface on the model sample in the computer, wherein all the displacement loading rates of each single actuator are the same or not the same;

Step 2: opening a first electromagnetic shutoff valve and a second electromagnetic shutoff valve in a static loading oil line, opening a third electromagnetic shutoff valve in a static-load pressure-stabilizing oil line, and closing a fourth electromagnetic shutoff valve in a static-pressure load-holding oil line;

Step 3: starting a static loading oil source, and performing static loading on the model sample according to a set static load value, wherein when instantaneous pressure in the static loading oil line is increased, pressure energy can be stored in a first energy accumulator in the form of compression energy; and when instantaneous pressure in the static loading oil line is reduced, the compression energy in the first energy accumulator can be supplemented to the static loading oil line to guarantee that pressure in the static loading oil line is stable;

Step 4: monitoring the displacement data of a piston rod of a reaction hydraulic cylinder in the single actuator through a magnetostrictive displacement sensor in real time in a static loading process, first feeding back the displacement data to a controller, then sending an oil supply signal to a first electro-hydraulic servo valve through the controller, dynamically adjusting oil supply quantity of a reaction hydraulic cylinder in real time through the first electro-hydraulic servo valve, and finally enabling an actual displacement loading rate to conform to a set value; and Step 5: completing an overload test of the model sample under the multi-surface multi-point cooperative displacement control mode.

The beneficial effects of the present invention includes: compared with the prior art, a newly designed prestressed frame structure is adopted, the self-deformation of test equipment in the loading process can be effectively controlled, and the reliability of test data is improved; a preparation and transportation mechanism for an artificial model sample is arranged for the first time, the preparation area and the loading area of the artificial model sample are effectively separated, the requirement for the precision detection of the artificial model sample in the preparation stage is met, and influence of low preparation precision of the artificial model sample on test data is avoided; and the long-time load holding ability, the external dynamic disturbance simulating ability and the displacement control overload ability under multi-faced multi-point cooperative control are provided for the first time.

DETAILED DESCRIPTION OF THE PREFERRED EMBODIMENT

The present invention is hereinafter described in detail with reference to the attached drawings and embodiments.

Figure 1:
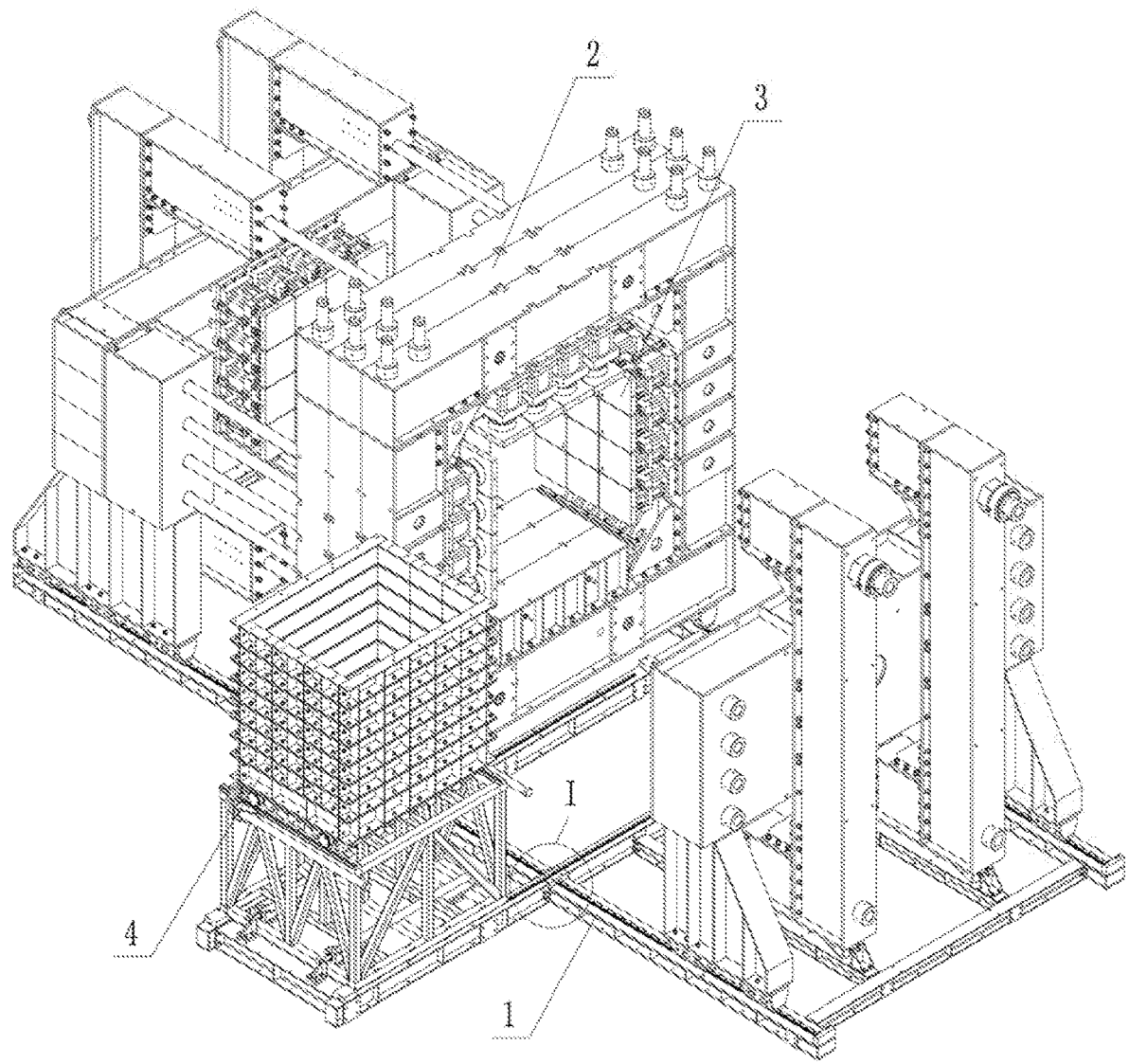
FIG. 1 is the structural diagram of the large-scale three-dimensional physical model test system (open state) for the deep cavern group of the present invention.
Figure 2:
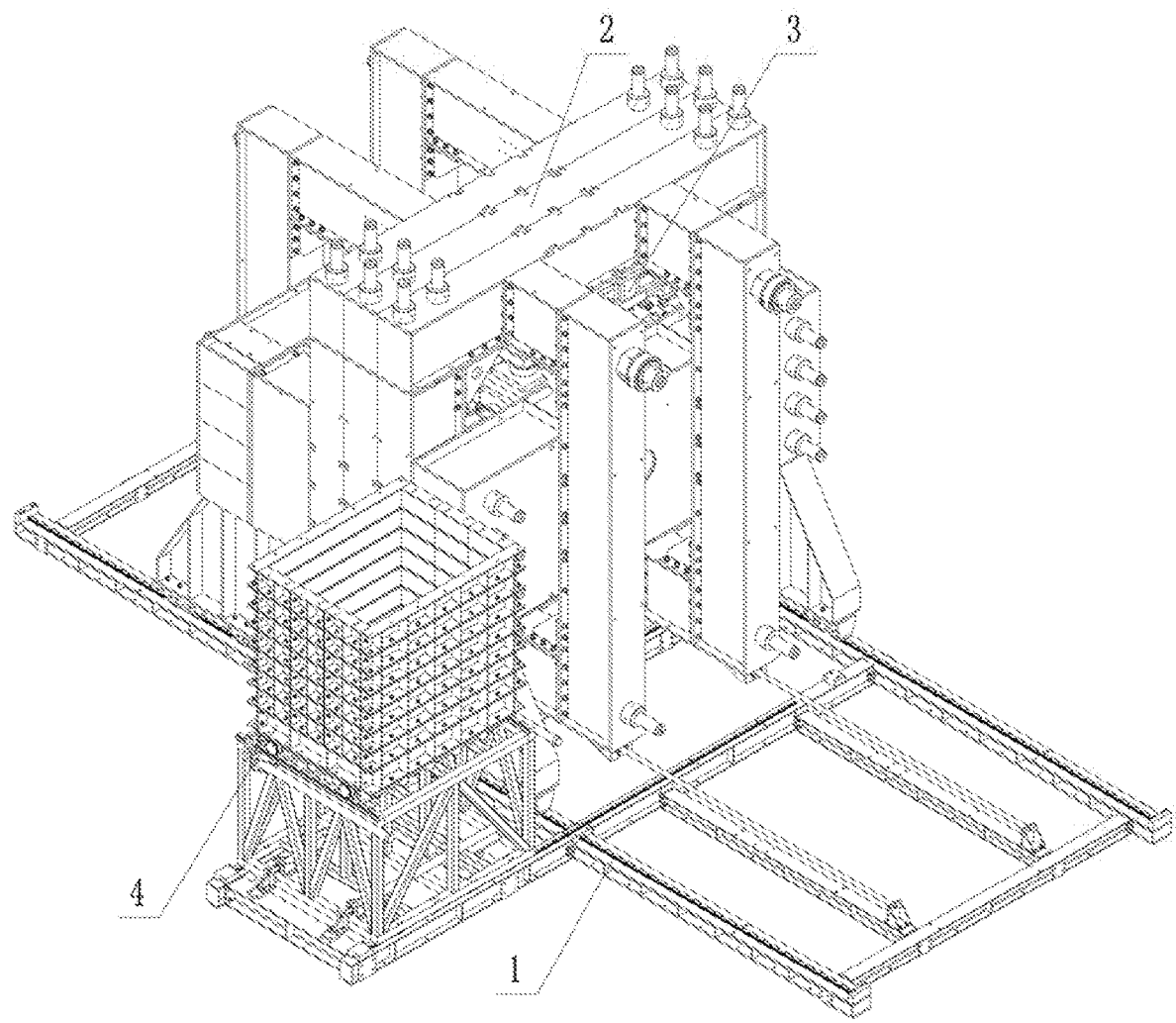
FIG. 2 is the structural diagram of the large-scale three-dimensional physical model test system (closed state) for the deep cavern group of the present invention.
Figure 3:
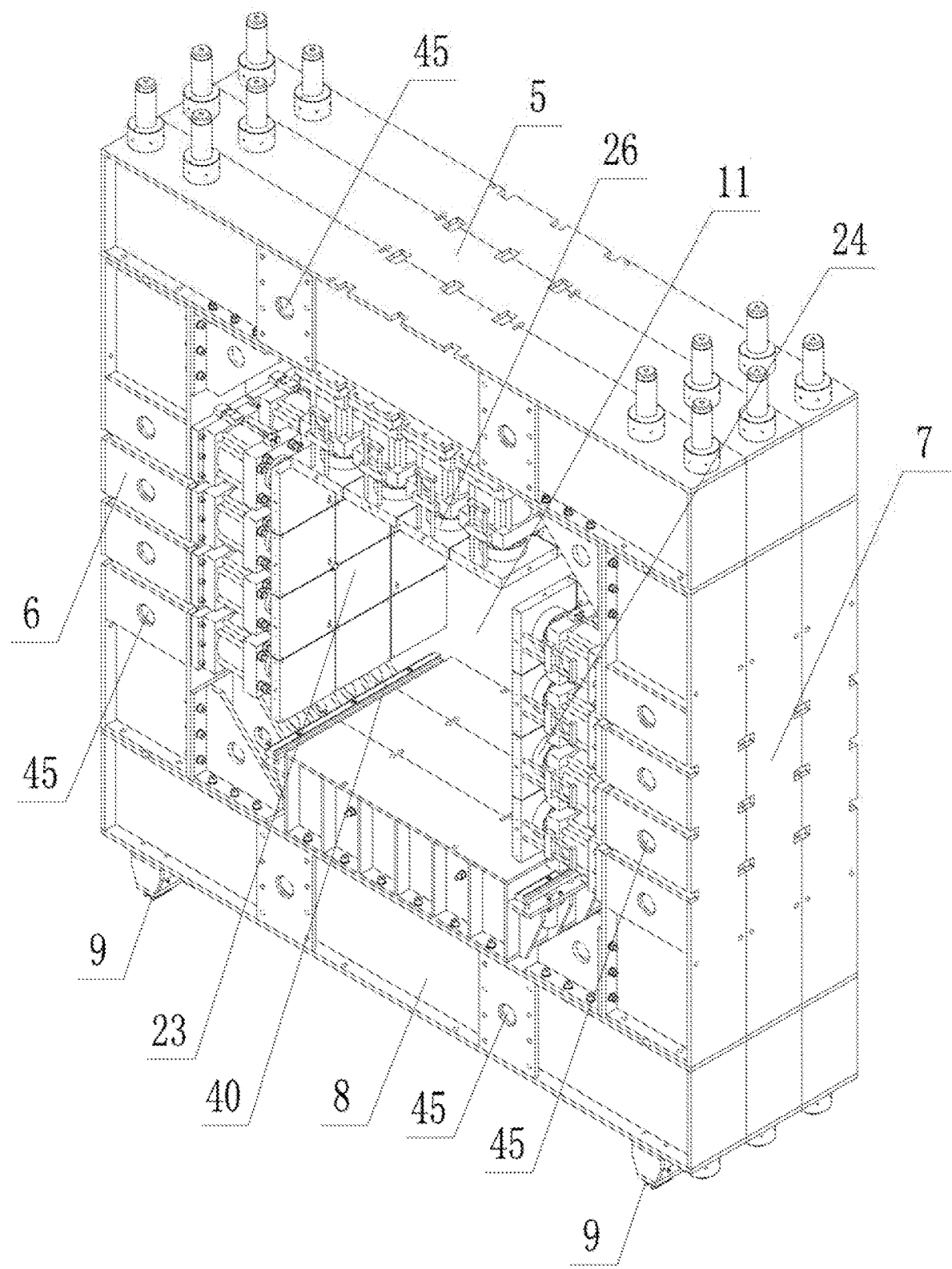
FIG. 3 is the structural diagram of a middle frame for an anti-deformation prestressed loading frame assembly of the present invention.
Figure 4:
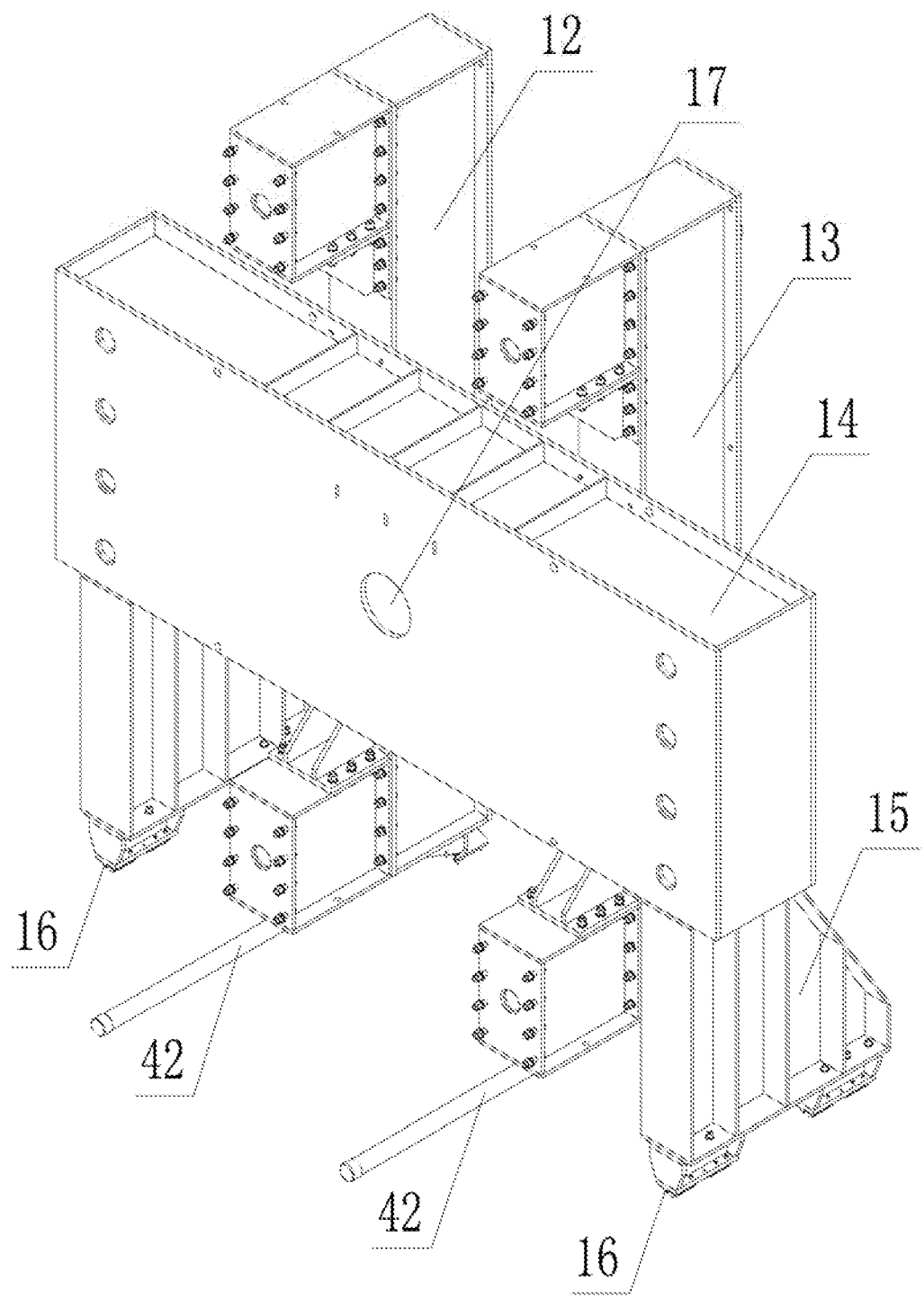
FIG. 4 is the structural diagram of a front-end frame for the anti-deformation prestressed loading frame assembly of the present invention.
Figure 5:
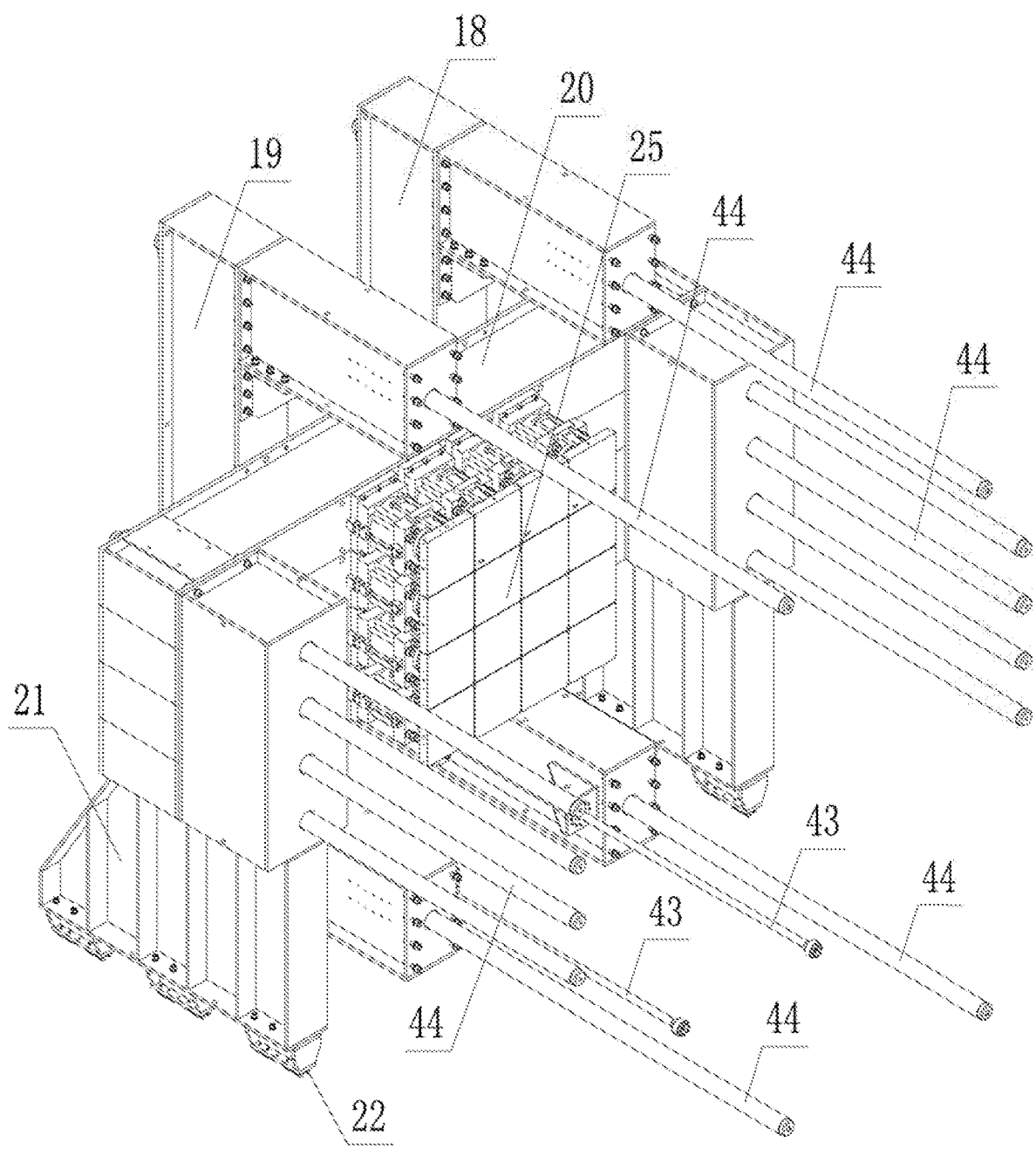
FIG. 5 is the structural diagram of a rear-end frame for the anti-deformation prestressed loading frame assembly of the present invention.
Figure 6:
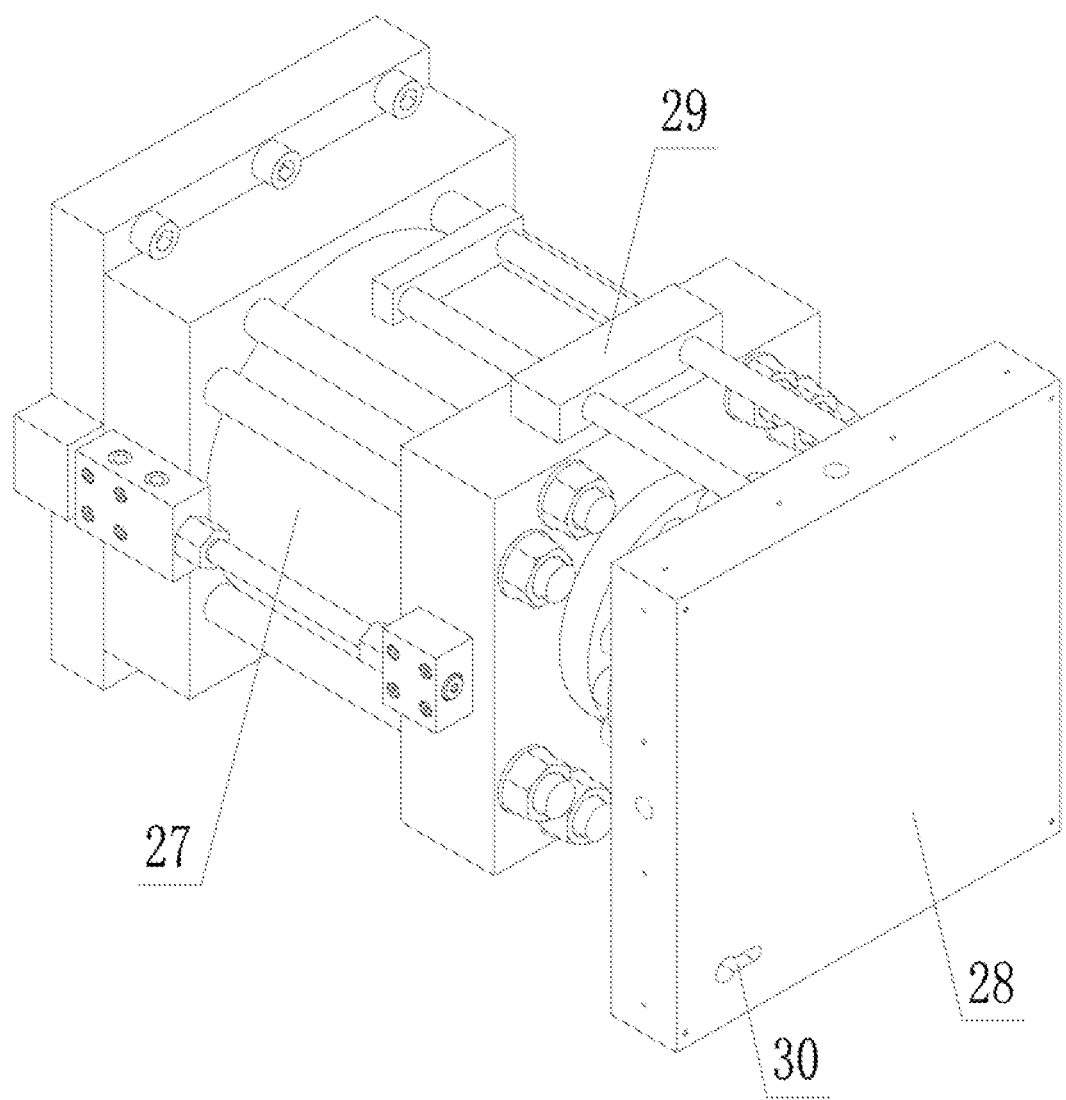
FIG. 6 is the structural diagram of single actuators for a load applying assembly of the present invention.
Figure 7:
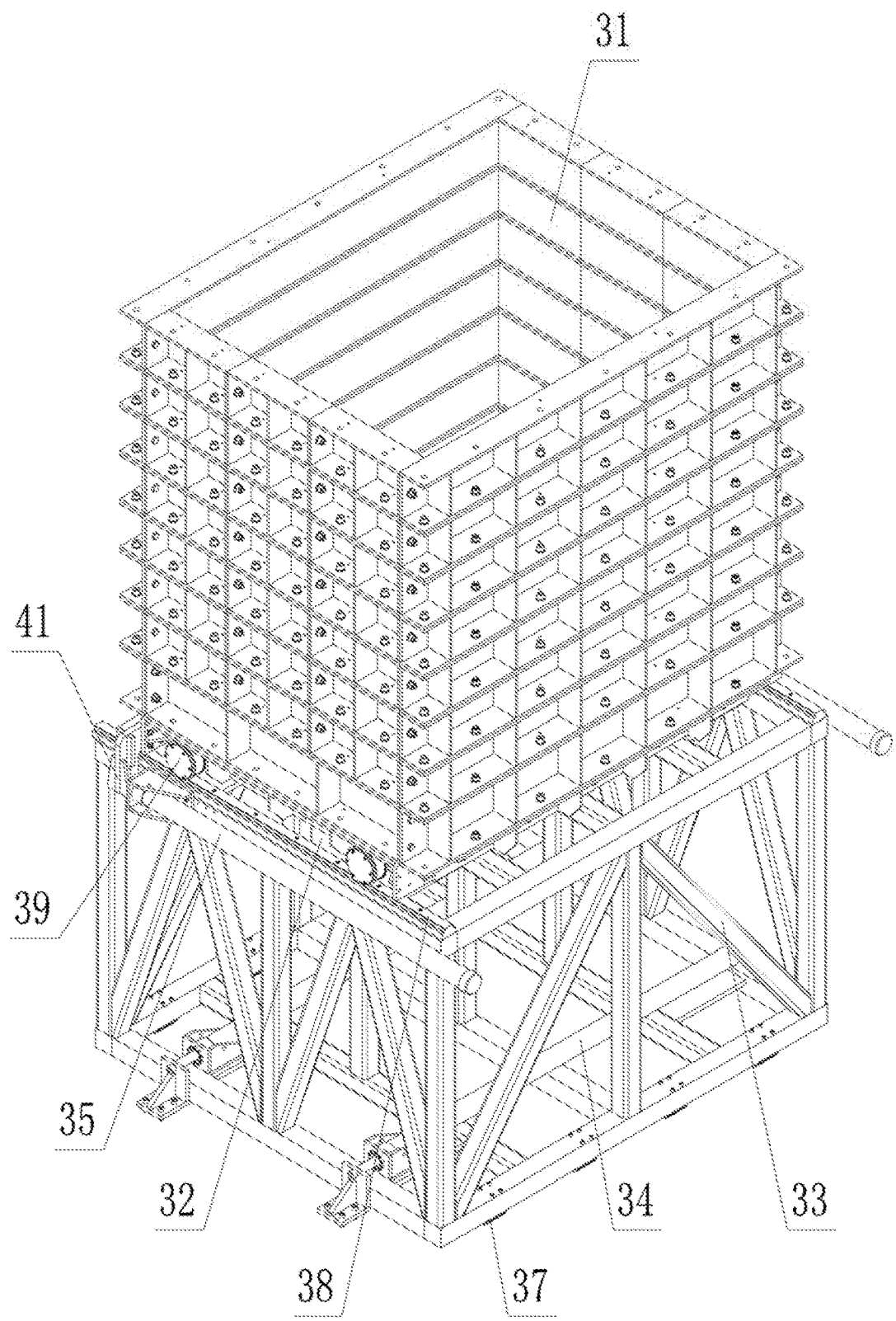
FIG. 7 is the structural diagram of a model sample preparation and transportation assembly of the present invention.
Figure 8:
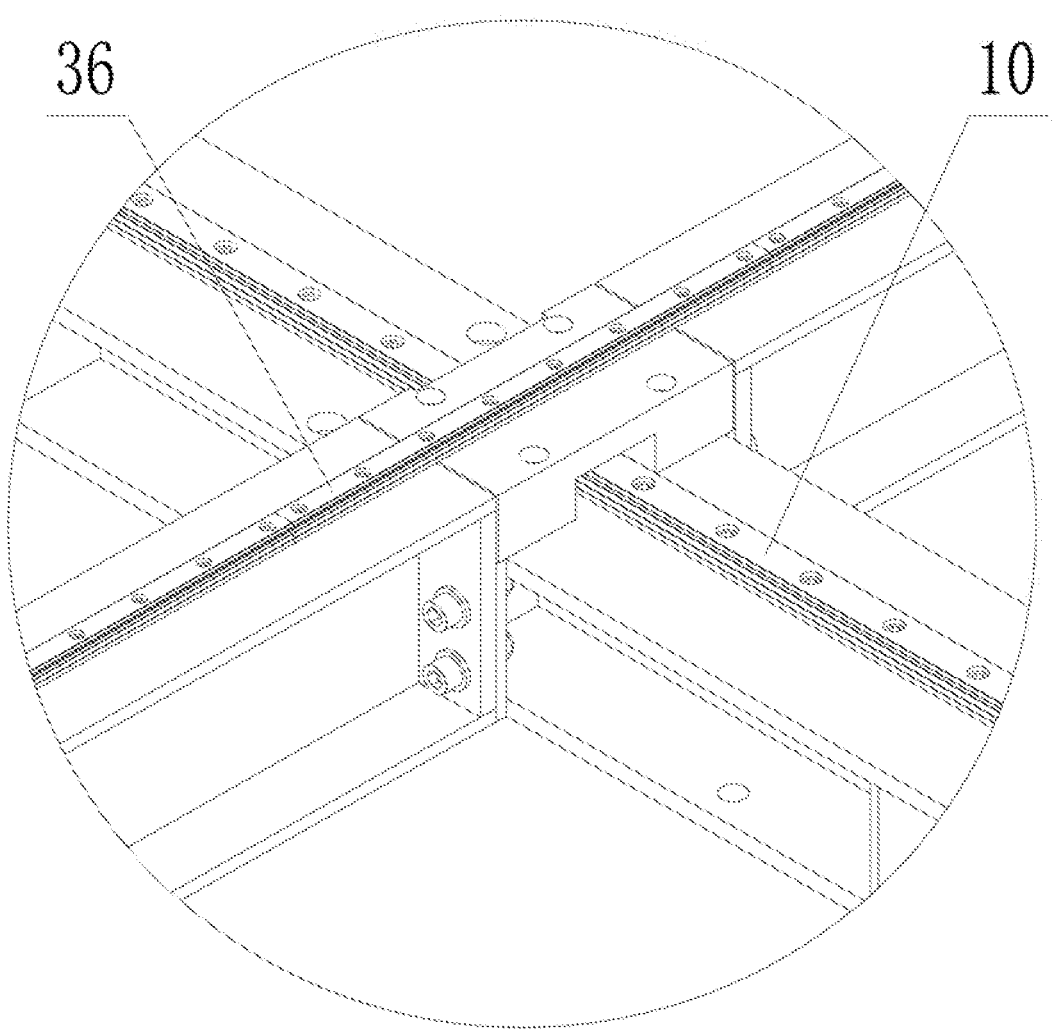
FIG. 8 is the enlarged view of part I in FIG. 1.
Figure 9:
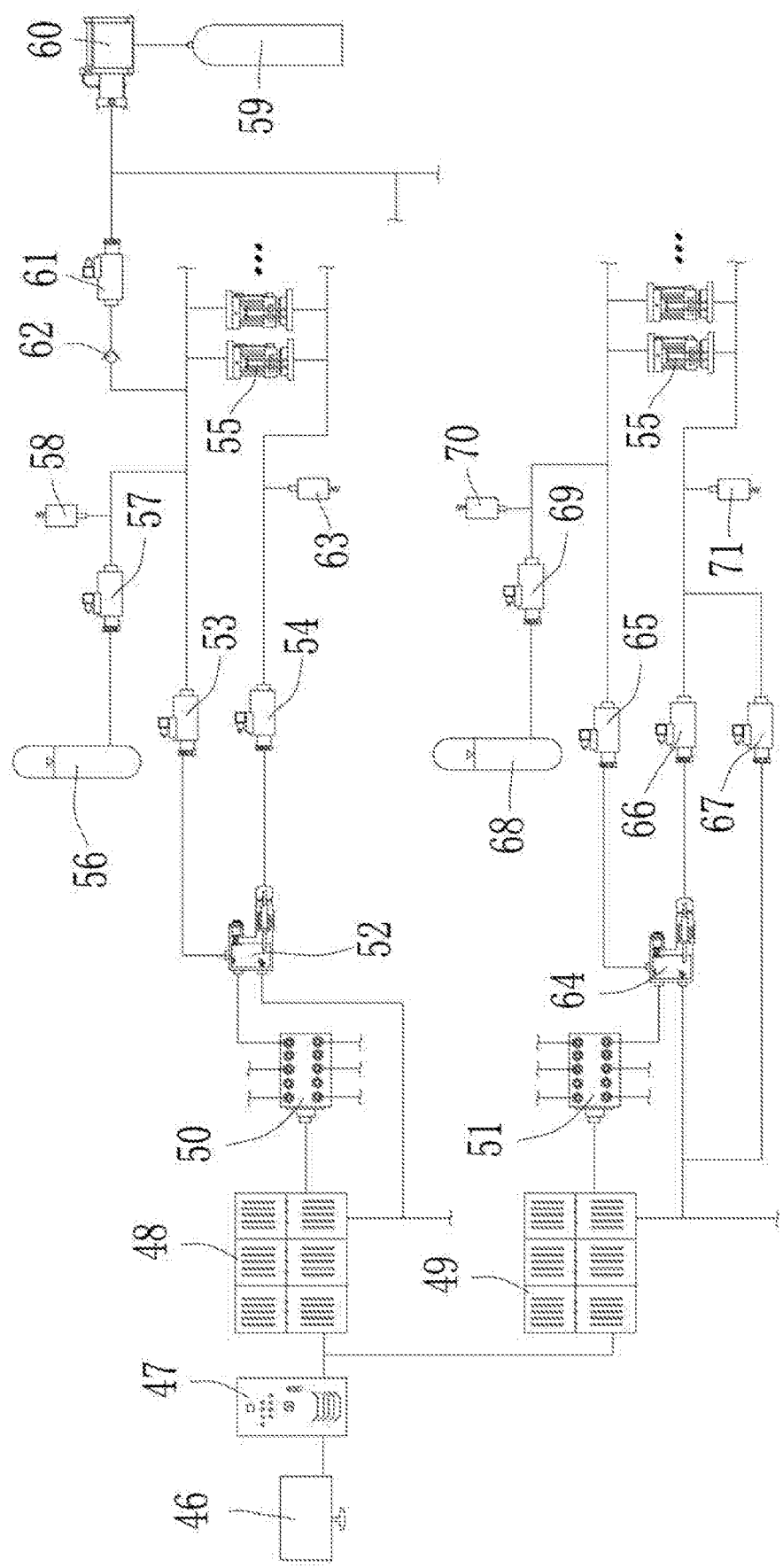
FIG. 9 is the schematic diagram of a multifunctional hydraulic loading system assembly of the present invention.

As shown in FIG. 1 to FIG. 9, a large-scale three-dimensional physical model test system for deep cavern group comprises a base 1, an anti-deformation prestressed loading frame assembly 2, a load applying assembly 3, a model sample preparation and transportation assembly 4 and a multifunctional hydraulic loading system assembly, wherein the anti-deformation prestressed loading frame assembly 2 and the model sample preparation and transportation assembly 4 are both arranged on the base 1, the load applying assembly 3 is arranged on the anti-deformation prestressed loading frame assembly 2, the load applying assembly 3 is connected with the multifunctional hydraulic loading system assembly, and a model sample is subjected to long-time load holding, dynamic disturbance or displacement control overload under multi-surface multi-point cooperative control through cooperation between the load applying assembly 3 and the multifunctional hydraulic loading system assembly.

The anti-deformation prestressed loading frame assembly 2 comprises a middle frame, a front-end frame and a rear-end frame, wherein the middle frame is located between the front-end frame and the rear-end frame.

The middle frame adopts a multi-truss type rectangle-shaped structure, the middle frame of each truss consists of a top cross beam 5, a left pillar 6, a right pillar 7 and a bottom cross beam 8, and the middle frames of any two adjacent trusses can be connected through a removable structure, wherein middle frame slide blocks 9 are mounted on the lower surface of the bottom cross beam 8, frame guide rails 10 are mounted on the upper surface of the base 1, and the middle frame has linear translation degree-of-freedom on the frame guide rails 10 through the middle frame slide blocks 9; and the rectangle-shaped cavity of the middle frame is a model sample loading cavity 11.

The front-end frame comprises a left reaction vertical beam 12, a right reaction vertical beam 13, a reaction cross beam 14 and reaction cross beam support seats 15, wherein the left reaction vertical beam 12 and the right reaction vertical beam 13 are symmetrically and fixedly mounted on the reaction cross beam 14, the reaction cross beam support seats 15 are fixedly connected to the lower surface of the reaction cross beam 14, front-end frame slide blocks 16 are mounted on the lower surfaces of the reaction cross beam support seats 15, and the front-end frame has linear translation degree-of-freedom on the frame guide rails 10 through the front-end frame slide blocks 16; a through hole is formed in the middle beam body of the reaction cross beam 14, the through hole acts as a model sample excavation hole 17, and the model sample excavation hole 17 is directly opposite to the model sample loading cavity 11; front-end frame driving hydraulic cylinders 42 are connected between the bottom end of the left reaction vertical beam 12 and the base 1 as well as between the bottom end of the right reaction vertical beam 13 and the base 1, and the front-end frame driving hydraulic cylinders 42 are parallel to the frame guide rails 10.

The rear-end frame comprises a left support vertical beam 18, a right support vertical beam 19, a support cross beam 20 and support cross beam support seats 21, wherein the left support vertical beam 18 and the right support vertical beam 19 are symmetrically and fixedly mounted on the support cross beam 20, the support cross beam support seats 21 are fixedly connected to the lower surface of the support cross beam 20, rear-end frame slide blocks 22 are mounted on the lower surfaces of the support cross beam support seats 21, and the rear-end frame has linear translation degree-of-freedom on the frame guide rails 10 through the rear-end frame slide blocks 22; middle-and-rear-end frame driving hydraulic cylinders 43 are connected between the bottom end of the left support vertical beam 18 and the bottom cross beam 8 of the middle frame as well as between the bottom end of the right support vertical beam 19 and the bottom cross beam 8 of the middle frame, and the middle-and-rear-end frame driving hydraulic cylinders 43 are parallel to the frame guide rails 10.

The left reaction vertical beam 12 and the left support vertical beam 18 are connected through prestressed pull rods 44, the right reaction vertical beam 13 and the right support vertical beam 19 are connected through the prestressed pull rods 44, the reaction cross beam 14 and the support cross beam 20 are connected through the prestressed pull rods 44, and pull rod passing holes 45 are respectively formed in the top cross beam 5, the left pillar 6, the right pillar 7 and the bottom cross beam 8; and pretightening force is applied to the prestressed pull rods 44 to realize prestressing locking among the middle frame, the front-end frame and the rear-end frame.

The load applying assembly 3 comprises a first horizontal actuator group 23, a second horizontal actuator group 24, a third horizontal actuator group 25 and a vertical actuator group 26, wherein the first horizontal actuator group 23 is arranged on the inner side surface of the left pillar 6 of the middle frame, the second horizontal actuator group 24 is arranged on the inner side surface of the right pillar 7 of the middle frame, the third horizontal actuator group 25 is arranged on the inner side surface of the support cross beam 20 of the rear-end frame, and the vertical actuator group 26 is arranged on the lower surface of the top cross beam 5 of the middle frame; a plurality of uniformly-distributed single actuators adopting the same structure are arranged in the first horizontal actuator group 23, the second horizontal actuator group 24, the third horizontal actuator group 25 and the vertical actuator group 26; each of the single actuators comprises a reaction hydraulic cylinder 27, a rectangular loading plate 28 and a magnetostrictive displacement sensor 29; the reaction hydraulic cylinder 27 is fixedly connected to the frame through a cylinder barrel, the rectangular loading plate 28 is vertically and fixedly mounted at the top end of a piston rod of the reaction hydraulic cylinder 27, and an acoustic emission probe arranging hole 30 is formed in the rectangular loading plate 28; and the magnetostrictive displacement sensor 29 is connected between the cylinder barrel of the reaction hydraulic cylinder 27 and the rectangular loading plate 28.

The model sample preparation and transportation assembly 4 comprises a model sample preparation box 31, a model sample bearing platform 32, a model sample transportation rack 33, transportation rack driving hydraulic cylinders 34 and bearing platform driving hydraulic cylinders 35, wherein transportation rack guide rails 36 are mounted on the upper surface of the base 1, the transportation rack guide rails 36 and the frame guide rails 10 are perpendicular to each other, the mounting height of the transportation rack guide rails 36 is greater than that of the frame guide rails 10, and the transportation rack guide rails 36 at the junctions with the frame guide rails 10 adopt a removable splicing structure; transportation rack slide blocks 37 are mounted on the lower surface of the model sample transportation rack 33, and the model sample transportation rack 33 has linear translation degree-of-freedom on the transportation rack guide rails 36 through the transportation rack slide blocks 37; the model sample bearing platform 37 is arranged on the model sample transportation rack 33, bearing platform guide rails 38 are mounted on the upper surface of the model sample transportation rack 33, bearing platform wheels 39 are mounted on the lower surface of the model sample bearing platform 32, and the model sample bearing platform 32 has linear translation degree-of-freedom on the bearing platform guide rails 38 through the bearing platform wheels 39; bearing platform adapting guide rails 40 are mounted on the upper surface of the bottom cross beam 8 in the model sample loading cavity 11 of the middle frame, and the model sample bearing platform 32 has linear translation degree-of-freedom on the bearing platform guide rails 38 through the bearing platform wheels 39; the transportation rack driving hydraulic cylinders 34 are connected between the base 1 and the model sample transportation rack 33, and the transportation rack driving hydraulic cylinders 34 are parallel to the transportation rack guide rails 36; the bearing platform driving hydraulic cylinders 35 are connected between the model sample transportation rack 33 and the model sample bearing platform 32, and are parallel to the bearing platform guide rails 38 and the bearing platform adapting guide rails 40, and piston rods of the bearing platform driving hydraulic cylinders 35 are connected with the model sample bearing platform 32 through locks 41; and the model sample preparation box 31 is located on the upper surface of the model sample bearing platform 32.

The multifunctional hydraulic loading system assembly comprises a computer 46, a controller 47, a static loading oil source 48, a dynamic loading oil source 49, a static loading oil distributor 50, a dynamic loading oil distributor 51, one or more static loading oil lines and one or more dynamic loading oil lines, wherein the computer 46 is connected with the controller 47, the controller 47 is separately connected with the static loading oil source 48 and the dynamic loading oil source 49 respectively, the static loading oil source 48 is connected with one or more static loading oil lines through the static loading oil distributor 50, and the dynamic loading oil source 49 is connected with one or more dynamic loading oil lines through the dynamic loading oil distributor 51.

Each of the static loading oil lines comprises a first electro-hydraulic servo valve 52, a first electromagnetic shutoff valve 53 and a second electromagnetic shutoff valve 54, wherein a first oil inlet of the first electro-hydraulic servo valve 52 is connected with the static loading oil distributor 50, one or more single actuators 55 are connected in parallel between a first oil outlet and a second oil inlet of the first electro-hydraulic servo valve 52, and a second oil outlet of the first electro-hydraulic servo valve 52 is connected with the static loading oil source 48; the first electromagnetic shutoff valve 53 is mounted on a pipeline between the first oil outlet of the first electro-hydraulic servo valve 52 and the single actuator 55, and the second electromagnetic shutoff valve 54 is mounted on a pipeline between the second oil inlet of the first electro-hydraulic servo valve 52 and the single actuator 55; a static-load pressure-stabilizing oil line and a static-pressure load-holding oil line are connected in parallel to a pipeline between the first electromagnetic shutoff valve 53 and the single actuator 55; the static-load pressure-stabilizing oil line comprises a first energy accumulator 56 and a third electromagnetic shutoff valve 57, wherein the first energy accumulator 56 is connected with the single actuator 55 through the third electromagnetic shutoff valve 57, and a first pressure sensor 58 is mounted on a pipeline between the third electromagnetic shutoff valve 57 and the single actuator 55; the static-pressure load-holding oil line comprises a load holding gas source 59, a gas-liquid booster pump 60, a fourth electromagnetic shutoff valve 61 and a one-way valve 62, wherein the load holding gas source 59 is connected with the gas-liquid booster pump 60, the gas-liquid booster pump 60 is connected with the liquid inlet end of the one-way valve 62 through the fourth electromagnetic shutoff valve 61, and the liquid outlet end of the one-way valve 62 is connected with the single actuator 55; a second pressure sensor 63 is mounted on a pipeline between the second electromagnetic shutoff valve 54 and the single actuator 55.

Each of the dynamic loading oil lines comprises a second electro-hydraulic servo valve 64, a fifth electromagnetic shutoff valve 65, a sixth electromagnetic shutoff valve 66 and a seventh electromagnetic shutoff valve 67, wherein a first oil inlet of the second electro-hydraulic servo valve 64 is connected with the dynamic loading oil distributor 51, one or more single actuators 55 are connected in parallel between a first oil outlet and a second oil inlet of the second electro-hydraulic servo valve 64, and the second oil outlet of the first electro-hydraulic servo valve 52 is connected with the dynamic loading oil source 49; the fifth electromagnetic shutoff valve 65 is mounted on a pipeline between the first oil outlet of the second electro-hydraulic servo valve 64 and the single actuator 55, and the sixth electromagnetic shutoff valve 66 is mounted on a pipeline between the second oil inlet of the second electro-hydraulic servo valve 64 and the single actuator 55; the seventh electromagnetic shutoff valve 67 is separately connected between the single actuator 55 and the dynamic loading oil source 49; a dynamic-load pressure-stabilizing oil line is connected to a pipeline between the fifth electromagnetic shutoff valve 65 and the single actuator 55; the dynamic-load pressure-stabilizing oil line comprises a second energy accumulator 68 and an eighth electromagnetic shutoff valve 69, wherein the second energy accumulator 68 is connected with the single actuator 55 through the eighth electromagnetic shutoff valve 69, and a third pressure sensor 70 is mounted on a pipeline between the eighth electromagnetic shutoff valve 69 and the single actuator; and a fourth pressure sensor 71 is mounted on a pipeline between the sixth electromagnetic shutoff valve 66 and the single actuator 55.

In the embodiment, the system adopts a CPCI bus technology and realizes logic control through PLC. 12 independent control channels are set in the system, wherein each of the first horizontal actuator group 23, the second horizontal actuator group 24 and the vertical actuator group 26 contains 12 single actuators 55 which are divided into four layers, and three single actuators are arranged in each layer; the third horizontal actuator group 25 contains 16 single actuators 55 which are divided into four layers, and four single actuators are arranged in each layer; because the first horizontal actuator group 23 and the second horizontal actuator group 24 are distributed symmetrically, the six single actuators 55 in the same layer of the two actuator groups are set to share one control channel, and four control channels are distributed to the two actuator groups in total; one control channel is distributed to three single actuators 55 in each layer of the vertical actuator group 26, and four control channels are distributed in total; and one control channel is distributed to four single actuators 55 in each layer of the third horizontal actuator group 25, and four control channels are distributed in total.

In the embodiment, the model sample preparation box 31 is formed by splicing small precision-machined parts by layers and sheets, and the dimensional deviation of all the parts need to be smaller than 1 mm. The model sample preparation box 31 is divided into eight layers in the height direction, each layer is 250 mm high, and the total height is 2,000 mm; three sheets of small parts are included in the width direction, and the model sample preparation boxes 31 with dimensions of 2,000 mm×2,000 mm×500 mm, 2,000 mm×2,000 mm×1,000 mm and 2,000 mm×2,000 mm×1,500 mm can be respectively formed by splicing, so that model samples with corresponding dimensions can be prepared. The model sample preparation box 31 is subjected to high-rigidity lateral restraint, so that the self-deformation of the model sample preparation box 31 can be effectively controlled under the premise of guaranteeing the gravity action of a model sample. A wire outlet for monitoring sensors is reserved in the box body side of the model sample preparation box 31, and a friction reducing layer is arranged on the inner surface of the box body. The model sample bearing platform 32 is made of high-rigidity steel plates with thickness not less than 300 mm, so that deformation under the gravity action of the model sample can be effectively controlled.

A large-scale physical model test method for a deep cavern group adopts the large-scale physical model test system for a deep cavern group and comprises the following steps of:

Step I: selecting a material according to test requirements, preparing a model sample from the material in the model sample preparation box 31, and pre-embedding monitoring sensors in the model sample;

Step II: demolding the model sample after the model sample reaches initial strength, and besides, detecting the flatness, the perpendicularity and the compactness of the model sample to guarantee that all indicators of the model sample are qualified;

Step III: firstly, moving the model sample transportation rack 33 to a position right ahead the model sample loading cavity 11, then moving the model sample bearing platform 32 into the model sample loading cavity 11 so that the model sample enters the model sample loading cavity 11 along with the model sample bearing platform 32, releasing locking between the model sample bearing platform 32 and the model sample transportation rack 33, and finally, moving the model sample transportation rack 33 back to the initial position;

Step IV: adjusting the anti-deformation prestressed loading frame assembly 2 from an open state to a closed state so that the middle frame, the front-end frame and the rear-end frame form a whole;

Step V: respectively controlling the actions of the first horizontal actuator group 23, the second horizontal actuator group 24, the third horizontal actuator group 25 and the vertical actuator group 26 until accurate centering and clamping of the model sample are completed;

Step VI: controlling the first horizontal actuator group 23, the second horizontal actuator group 24, the third horizontal actuator group 25 and the vertical actuator group 26 to perform true triaxial static loading on the model sample in the multi-surface multi-point cooperative displacement control mode, then excavating the model sample under the set static loading level, and besides, observing the deformation fracture evolution condition of the model sample;

Step VII: after excavation is completed, switching the loading state to the long-time load holding state, overload state or dynamic disturbance state according to test requirements, observing the failure fracture evolution condition of the model sample in the long-time load holding state, and observing the deformation fracture evolution condition of the model sample in the overload state or dynamic disturbance state;

Step VIII: separately controlling the actions of the first horizontal actuator group 23, the second horizontal actuator group 24, the third horizontal actuator group 25 and the vertical actuator group 26 until the unloading of the model sample is completed; and Step IX: first, moving the model sample transportation rack 33 to a position right ahead the model sample loading cavity 11, then locking the model sample bearing platform 32 and the model sample transportation rack 33, moving the model sample bearing platform 32 from the model sample loading cavity 11 to the model sample transportation rack 33, finally moving the model sample transportation rack 33 back to the initial position, and performing further analysis study on the taken-out model sample.

The control steps of long-time load holding are as follows:

Step 1: setting the static load value for each loading surface of the model sample in the computer 46, wherein all the static load values output by each single actuator 55 in each loading surface are the same or not the same;

Step 2: opening the first electromagnetic shutoff valve 53 and the second electromagnetic shutoff valve 54 in the static loading oil line, opening the third electromagnetic shutoff valve 57 in the static-load pressure-stabilizing oil line, and closing the fourth electromagnetic shutoff valve 61 in the static-pressure load-holding oil line;

Step 3: starting the static loading oil source 48, and performing static loading on the model sample according to the set static load value, wherein when instantaneous pressure in the static loading oil line is increased, pressure energy can be stored in the first energy accumulator 56 in the form of compression energy; and when instantaneous pressure in the static loading oil line is reduced, the compression energy in the first energy accumulator 56 can be supplemented to the static loading oil line to guarantee that pressure in the static loading oil line is stable;

Step 4: after static loading reaches the set value, closing the first electromagnetic shutoff valve 53 and the second electromagnetic shutoff valve 54 in the static loading oil line, closing the third electromagnetic shutoff valve 57 in the static-load pressure-stabilizing oil line, and opening the fourth electromagnetic shutoff valve 61 in the static-pressure load-holding oil line; and Step 5: closing the static loading oil source 48, and starting the pressure holding mode, wherein with increase in loading time, when the pressure in the static loading oil line is reduced to be the set value or below, the gas-liquid booster pump 60 in the static-pressure load-holding oil line is started, lost oil pressure is supplemented to the static loading oil line through the gas-liquid booster pump 60 until the pressure is restored to the set value, and at the moment, the gas-liquid booster pump 60 is closed. The time for long-time load holding required in the embodiment is not less than 12 months.

The control steps of dynamic disturbance are as follows:

Step 1: setting the static load value for each loading surface of the model sample in the computer 46, wherein all the static load values output by each single actuator 55 in each loading surface are the same or not the same;

Step 2: opening the first electromagnetic shutoff valve 53 and the second electromagnetic shutoff valve 54 in the static loading oil line, opening the third electromagnetic shutoff valve 57 in the static-load pressure-stabilizing oil line, and closing the fourth electromagnetic shutoff valve 61 in the static-pressure load-holding oil line;

Step 3: starting the static loading oil source 48, and performing static loading on the model sample according to the set static load value, wherein when instantaneous pressure in the static loading oil line is increased, pressure energy can be stored in the first energy accumulator 56 in the form of compression energy; and when instantaneous pressure in the static loading oil line is reduced, the compression energy in the first energy accumulator 56 can be supplemented to the static loading oil line to guarantee that pressure in the static loading oil line is stable;

Step 4: selecting one or more loading faces as dynamic disturbance faces, and setting the amplitude and the frequency of dynamic load in the computer 46, wherein all the amplitude and all the frequency of the dynamic load output by each single actuator 55 in the dynamic disturbance faces are the same or not the same;

Step 5: opening the fifth electromagnetic shutoff valve 65, the sixth electromagnetic shutoff valve 66 and the seventh electromagnetic shutoff valve 67 in the dynamic loading oil line, and opening the eighth electromagnetic shutoff valve 69 in the dynamic-load pressure-stabilizing oil line; and Step 6: starting the dynamic loading oil source 49, and starting the second electro-hydraulic servo valve 64 in the dynamic loading oil line so that the valve element of the second electro-hydraulic servo valve 64 makes high-frequency reciprocating motion, then the reaction hydraulic cylinder 27 in the single actuator 55 completes high-frequency oil supply and oil return, and the model sample is subjected to dynamic disturbance according to the set dynamic load, wherein during dynamic disturbance, when pressure fluctuates in the dynamic loading oil line, pressure is saved and released through the second energy accumulator 68 to guarantee that pressure of the dynamic loading oil line is stable. In the embodiment, the maximum disturbance frequency of the dynamic load is required to be 10 Hz, the maximum amplitude of the dynamic load is not less than 1.5 MPa, the discharge capacity of the dynamic loading oil source 49 accounts for ⅔ of the total system displacement, and the discharge capacity of the static loading oil source 48 account for ⅓ of the total system displacement.

The control steps of multi-surface multi-point cooperative displacement are as follows:

Step 1: setting the displacement loading rate of each single actuator 55 in each loading surface on the model sample in the computer 46, wherein all the displacement loading rates of each single actuator 55 are the same or not the same;

Step 2: opening the first electromagnetic shutoff valve 53 and the second electromagnetic shutoff valve 54 in the static loading oil line, opening the third electromagnetic shutoff valve 57 in the static-load pressure-stabilizing oil line, and closing the fourth electromagnetic shutoff valve 61 in the static-pressure load-holding oil line;

Step 3: starting the static loading oil source 48, and performing static loading on the model sample according to the set static load value, wherein when instantaneous pressure in the static loading oil line is increased, pressure energy can be stored in the first energy accumulator 56 in the form of compression energy; and when instantaneous pressure in the static loading oil line is reduced, the compression energy in the first energy accumulator 56 can be supplemented to the static loading oil line to guarantee that pressure in the static loading oil line is stable;

Step 4: monitoring the displacement data of the piston rod of the reaction hydraulic cylinder 27 in the single actuator 55 through the magnetostrictive displacement sensor 29 in real time in the static loading process, first feeding back the displacement data to the controller 47, then sending an oil supply signal to the first electro-hydraulic servo valve 52 through the controller 47, dynamically adjusting the oil supply quantity of the reaction hydraulic cylinder 27 in real time through the first electro-hydraulic servo valve 52, and finally enabling the actual displacement loading rate to conform to the set value; and Step 5: completing the overload test of the model sample under the multi-surface multi-point cooperative displacement control mode.

The scheme in the embodiment is not intended to limit the patent protection scope of the present invention, and any equivalent implementation or change made without departing from the present invention shall be included in the scope of the patent of the scheme.

What is claimed is:

1. A large-scale three-dimensional physical model test system for a deep cavern group, comprising:
   a base;
   an anti-deformation prestressed loading frame assembly;
   a load applying assembly;
   a model sample preparation and transportation assembly; and
   a multifunctional hydraulic loading system assembly,
   wherein the anti-deformation prestressed loading frame assembly and the model sample preparation and transportation assembly are both arranged on the base,
   wherein the load applying assembly is arranged on the anti-deformation prestressed loading frame assembly, the load applying assembly is connected with the multifunctional hydraulic loading system assembly,
   wherein a model sample is subjected to long-time load holding, dynamic disturbance or displacement control overload under multi-surface multi-point cooperative control through cooperation between the load applying assembly and the multifunctional hydraulic loading system assembly,
   wherein the anti-deformation prestressed loading frame assembly comprises a middle frame, a front-end frame and a rear-end frame, wherein the middle frame is located between the front-end frame and the rear-end frame,
   wherein the middle frame adopts a multi-truss type rectangle-shaped structure, the middle frame of each truss consists of a top cross beam, a left pillar, a right pillar and a bottom cross beam, and the middle frames of any two adjacent trusses can be connected through a removable structure, wherein middle frame slide blocks are mounted on a lower surface of the bottom cross beam, frame guide rails are mounted on an upper surface of the base, and the middle frame has linear translation degree-of-freedom on the frame guide rails through the middle frame slide blocks; a rectangle-shaped cavity of the middle frame is a model sample loading cavity,
   wherein the front-end frame comprises a left reaction vertical beam, a right reaction vertical beam, a reaction cross beam and reaction cross beam support seats, wherein the left reaction vertical beam and the right reaction vertical beam are symmetrically and fixedly mounted on the reaction cross beam, the reaction cross beam support seats are fixedly connected to a lower surface of the reaction cross beam, front-end frame slide blocks are mounted on lower surfaces of the reaction cross beam support seats, and the front-end frame has linear translation degree-of-freedom on the frame guide rails through the front-end frame slide blocks; a through hole is formed in a middle beam body of the reaction cross beam, the through hole acts as a model sample excavation hole, and the model sample excavation hole is directly opposite to the model sample loading cavity; front-end frame driving hydraulic cylinders are connected between a bottom end of the left reaction vertical beam and the base as well as between a bottom end of the right reaction vertical beam and the base, and the front-end frame driving hydraulic cylinders are parallel to the frame guide rails, wherein the rear-end frame comprises a left support vertical beam, a right support vertical beam, a support cross beam and support cross beam support seats, wherein the left support vertical beam and the right support vertical beam are symmetrically and fixedly mounted on the support cross beam, the support cross beam support seats are fixedly connected to a lower surface of the support cross beam, rear-end frame slide blocks are mounted on lower surfaces of the support cross beam support seats, and the rear-end frame has linear translation degree-of-freedom on the frame guide rails through the rear-end frame slide blocks; middle-and-rear-end frame driving hydraulic cylinders are connected between a bottom end of the left support vertical beam and the bottom cross beam of the middle frame as well as between a bottom end of the right support vertical beam and the bottom cross beam of the middle frame, and the middle-and-rear-end frame driving hydraulic cylinders are parallel to the frame guide rails, and wherein the left reaction vertical beam and the left support vertical beam are connected through prestressed pull rods, the right reaction vertical beam and the right support vertical beam are connected through the prestressed pull rods, the reaction cross beam and the support cross beam are connected through the prestressed pull rods, and pull rod passing holes are respectively formed in the top cross beam, the left pillar, the right pillar and the bottom cross beam; and pretightening force is applied to the prestressed pull rods to realize prestressing locking among the middle frame, the front-end frame and the rear-end frame.

2. The large-scale three-dimensional physical model test system for the deep cavern group according to claim 1, wherein the load applying assembly comprises a first horizontal actuator group, a second horizontal actuator group, a third horizontal actuator group and a vertical actuator group, wherein the first horizontal actuator group is arranged on an inner side surface of the left pillar of the middle frame, the second horizontal actuator group is arranged on an inner side surface of the right pillar of the middle frame, the third horizontal actuator group is arranged on an inner side surface of the support cross beam of the rear-end frame, and the vertical actuator group is arranged on a lower surface of the top cross beam of the middle frame; a plurality of uniformly-distributed single actuators adopting the same structure are respectively arranged in the first horizontal actuator group, the second horizontal actuator group, the third horizontal actuator group and the vertical actuator group; each of the single actuators comprises a reaction hydraulic cylinder, a rectangular loading plate and a magnetostrictive displacement sensor; the reaction hydraulic cylinder is fixedly connected to the frame through a cylinder barrel, the rectangular loading plate is vertically and fixedly mounted at a top end of a piston rod of the reaction hydraulic cylinder, and an acoustic emission probe arranging hole is formed in the rectangular loading plate; and the magnetostrictive displacement sensor is connected between the cylinder barrel of the reaction hydraulic cylinder and the rectangular loading plate.

3. The large-scale three-dimensional physical model test system for the deep cavern group according to claim 1, wherein the model sample preparation and transportation assembly comprises a model sample preparation box, a model sample bearing platform, a model sample transportation rack, transportation rack driving hydraulic cylinders and bearing platform driving hydraulic cylinders, wherein transportation rack guide rails are mounted on the upper surface of the base, the transportation rack guide rails and the frame guide rails are perpendicular to each other, a mounting height of the transportation rack guide rails is greater than that of the frame guide rails, and the transportation rack guide rails at the junctions with the frame guide rails adopt a removable splicing structure; transportation rack slide blocks are mounted on a lower surface of the model sample transportation rack, and the model sample transportation rack has linear translation degree-of-freedom on the transportation rack guide rails through the transportation rack slide blocks; the model sample bearing platform is arranged on the model sample transportation rack, bearing platform guide rails are mounted on an upper surface of the model sample transportation rack, bearing platform wheels are mounted on a lower surface of the model sample bearing platform, and the model sample bearing platform has linear translation degree-of-freedom on the bearing platform guide rails through the bearing platform wheels; bearing platform adapting guide rails are mounted on an upper surface of the bottom cross beam in the model sample loading cavity of the middle frame, and the model sample bearing platform has linear translation degree-of-freedom on the bearing platform guide rails through the bearing platform wheels; the transportation rack driving hydraulic cylinders are connected between the base and the model sample transportation rack, and the transportation rack driving hydraulic cylinders are parallel to the transportation rack guide rails; the bearing platform driving hydraulic cylinders are connected between the model sample transportation rack and the model sample bearing platform, and are parallel to the bearing platform guide rails and the bearing platform adapting guide rails, and piston rods of the bearing platform driving hydraulic cylinders are connected with the model sample bearing platform through locks; and the model sample preparation box is located on an upper surface of the model sample bearing platform.

4. The large-scale three-dimensional physical model test system for the deep cavern group according to claim 2, wherein the multifunctional hydraulic loading system assembly comprises a computer, a controller, a static loading oil source, a dynamic loading oil source, a static loading oil distributor, a dynamic loading oil distributor, one or more static loading oil lines and one or more dynamic loading oil lines, wherein the computer is connected with the controller, the controller is separately connected with the static loading oil source and the dynamic loading oil source, the static loading oil source is connected with one or more static loading oil lines through the static loading oil distributor, and the dynamic loading oil source is connected with one or more dynamic loading oil lines through the dynamic loading oil distributor, wherein each of the static loading oil lines comprises a first electro-hydraulic servo valve, a first electromagnetic shutoff valve and a second electromagnetic shutoff valve, wherein a first oil inlet of the first electro-hydraulic servo valve is connected with the static loading oil distributor, one or more single actuators are connected in parallel between a first oil outlet and a second oil inlet of the first electro-hydraulic servo valve, and a second oil outlet of the first electro-hydraulic servo valve is connected with the static loading oil source; the first electromagnetic shutoff valve is mounted on a pipeline between the first oil outlet of the first electro-hydraulic servo valve and the single actuator, and the second electromagnetic shutoff valve is mounted on a pipeline between the second oil inlet of the first electro-hydraulic servo valve and the single actuator; a static-load pressure-stabilizing oil line and a static-pressure load-holding oil line are connected in parallel to a pipeline between the first electromagnetic shutoff valve and the single actuator; the static-load pressure-stabilizing oil line comprises a first energy accumulator and a third electromagnetic shutoff valve, wherein the first energy accumulator is connected with the single actuator through the third electromagnetic shutoff valve, and a first pressure sensor is mounted on a pipeline between the third electromagnetic shutoff valve and the single actuator; the static-pressure load-holding oil line comprises a load holding gas source, a gas-liquid booster pump, a fourth electromagnetic shutoff valve and a one-way valve, wherein the load holding gas source is connected with the gas-liquid booster pump, the gas-liquid booster pump is connected with a liquid inlet end of the one-way valve through the fourth electromagnetic shutoff valve, and a liquid outlet end of the one-way valve is connected with the single actuator; a second pressure sensor is mounted on a pipeline between the second electromagnetic shutoff valve and the single actuator, and wherein each of the dynamic loading oil lines comprises a second electro-hydraulic servo valve, a fifth electromagnetic shutoff valve, a sixth electromagnetic shutoff valve and a seventh electromagnetic shutoff valve, wherein a first oil inlet of the second electro-hydraulic servo valve is connected with the dynamic loading oil distributor, one or more single actuators are connected in parallel between a first oil outlet and a second oil inlet of the second electro-hydraulic servo valve, and the second oil outlet of the first electro-hydraulic servo valve is connected with the dynamic loading oil source; the fifth electromagnetic shutoff valve is mounted on a pipeline between the first oil outlet of the second electro-hydraulic servo valve and the single actuator, and the sixth electromagnetic shutoff valve is mounted on a pipeline between the second oil inlet of the second electro-hydraulic servo valve and the single actuator; the seventh electromagnetic shutoff valve is separately connected between the single actuator and the dynamic loading oil source; a dynamic-load pressure-stabilizing oil line is connected to a pipeline between the fifth electromagnetic shutoff valve and the single actuator; the dynamic-load pressure-stabilizing oil line comprises a second energy accumulator and an eighth electromagnetic shutoff valve, wherein the second energy accumulator is connected with the single actuator through the eighth electromagnetic shutoff valve, and a third pressure sensor is mounted on a pipeline between the eighth electromagnetic shutoff valve and the single actuator; and a fourth pressure sensor is mounted on a pipeline between the sixth electromagnetic shutoff valve and the single actuator.

5. A large-scale three-dimensional physical model test method for a deep cavern group, adopting the large-scale three-dimensional physical model test system for the deep cavern group according to claim 1, comprising the following steps of:

Step I: selecting a material according to test requirements, preparing a model sample from the material in a model sample preparation box, and pre-embedding monitoring sensors in the model sample;

Step II: demolding the model sample after the model sample reaches initial strength, and besides, detecting flatness, perpendicularity and compactness of the model sample to guarantee that all indicators of the model sample are qualified;

Step III: firstly, moving a model sample transportation rack to a position right ahead a model sample loading cavity, then moving a model sample bearing platform into the model sample loading cavity so that the model sample enters the model sample loading cavity along with the model sample bearing platform, releasing locking between the model sample bearing platform and the model sample transportation rack, and finally, moving the model sample transportation rack back to an initial position;

Step IV: adjusting the anti-deformation prestressed loading frame assembly from an open state to a closed state so that a middle frame, a front-end frame and a rear-end frame form a whole;

Step V: respectively controlling the actions of a first horizontal actuator group, a second horizontal actuator group, a third horizontal actuator group and a vertical actuator group until accurate centering and clamping of the model sample are completed;

Step VI: controlling the first horizontal actuator group, the second horizontal actuator group, the third horizontal actuator group and the vertical actuator group to perform true triaxial static loading on the model sample in a multi-surface multi-point cooperative displacement control mode, then excavating the model sample under a set static loading level, and besides, observing a deformation fracture evolution condition of the model sample;

Step VII: after excavation is completed, switching the loading state to a long-time load holding state, overload state or dynamic disturbance state according to test requirements, observing a failure fracture evolution condition of the model sample in the long-time load holding state, and observing the deformation fracture evolution condition of the model sample in the overload state or dynamic disturbance state;

Step VIII: separately controlling the actions of the first horizontal actuator group, the second horizontal actuator group, the third horizontal actuator group and the vertical actuator group until the unloading of the model sample is completed; and Step IX: first, moving the model sample transportation rack to a position right ahead the model sample loading cavity, then locking the model sample bearing platform and the model sample transportation rack, moving the model sample bearing platform from the model sample loading cavity to the model sample transportation rack, finally moving the model sample transportation rack back to the initial position, and performing further analysis study on the taken-out model sample.

6. The large-scale three-dimensional physical model test method for a deep cavern group according to claim 5, wherein the control steps for long-time load holding comprise:

Step 1: setting a static load value for each loading surface of the model sample in the computer, wherein all the static load values output by single actuators in each loading surface are the same or not the same;

Step 2: opening a first electromagnetic shutoff valve and a second electromagnetic shutoff valve in a static loading oil line, opening a third electromagnetic shutoff valve in a static-load pressure-stabilizing oil line, and closing a fourth electromagnetic shutoff valve in a static-pressure load-holding oil line;

Step 3: starting a static loading oil source, and performing static loading on the model sample according to a set static load value, wherein when instantaneous pressure in the static loading oil line is increased, pressure energy can be stored in a first energy accumulator in the form of compression energy; and when instantaneous pressure in the static loading oil line is reduced, the compression energy in the first energy accumulator can be supplemented to the static loading oil line to guarantee that pressure in the static loading oil line is stable;

Step 4: after the static loading reaches a set value, closing the first electromagnetic shutoff valve and the second electromagnetic shutoff valve in the static loading oil line, closing the third electromagnetic shutoff valve in the static-load pressure-stabilizing oil line, and opening the fourth electromagnetic shutoff valve in the static-pressure load-holding oil line; and Step 5: closing the static loading oil source, and starting a pressure holding mode, wherein with increase in loading time, when the pressure in the static loading oil line is reduced to be the set value or below, a gas-liquid booster pump in the static-pressure load-holding oil line is started, lost oil pressure is supplemented to the static loading oil line through the gas-liquid booster pump until the pressure is restored to the set value, and at the moment, the gas-liquid booster pump is closed.

7. The large-scale three-dimensional physical model test method for a deep cavern group according to claim 5, wherein the control steps for dynamic disturbance comprise:

Step 1: setting a static load value for each loading surface of the model sample in the computer, wherein all the static load values output by single actuators in each loading surface are the same or not the same;

Step 2: opening the a electromagnetic shutoff valve and a second electromagnetic shutoff valve in a static loading oil line, opening a third electromagnetic shutoff valve in a static-load pressure-stabilizing oil line, and closing a fourth electromagnetic shutoff valve in a static-pressure load-holding oil line;

Step 3: starting a static loading oil source, and performing static loading on the model sample according to the set static load value, wherein when instantaneous pressure in the static loading oil line is increased, pressure energy can be stored in a first energy accumulator in the form of compression energy; and when instantaneous pressure in the static loading oil line is reduced, the compression energy in the first energy accumulator can be supplemented to the static loading oil line to guarantee that pressure in the static loading oil line is stable;

Step 4: selecting one or more loading surfaces as dynamic disturbance surfaces, and setting an amplitude and a frequency of dynamic load in the computer, wherein all the amplitude and all the frequency of the dynamic load output by the single actuators in the dynamic disturbance surfaces are the same or not the same;

Step 5: opening a fifth electromagnetic shutoff valve, a sixth electromagnetic shutoff valve and a seventh electromagnetic shutoff valve in a dynamic loading oil line, and opening an eighth electromagnetic shutoff valve in a dynamic-load pressure-stabilizing oil line; and Step 6: starting the dynamic loading oil source, and starting a second electro-hydraulic servo valve in the dynamic loading oil line, so that a valve element of the second electro-hydraulic servo valve makes high-frequency reciprocating motion, then a reaction hydraulic cylinder in the single actuator completes high-frequency oil supply and oil return, and the model sample is subjected to dynamic disturbance according to the set dynamic load, wherein during dynamic disturbance, when pressure fluctuates in the dynamic loading oil line, pressure is saved and released through a second energy accumulator to guarantee that the pressure of the dynamic loading oil line is stable.

8. The large-scale three-dimensional physical model test method for a deep cavern group according to claim 5, wherein the control steps for multi-surface multi-point cooperative displacement comprise:

Step 1: setting a displacement loading rate of single actuators in each loading surface on the model sample in the computer, wherein all the displacement loading rates of the single actuators are the same or not the same;

Step 2: opening a first electromagnetic shutoff valve and a second electromagnetic shutoff valve in a static loading oil line, opening a third electromagnetic shutoff valve in a static-load pressure-stabilizing oil line, and closing a fourth electromagnetic shutoff valve in a static-pressure load-holding oil line;

Step 3: starting a static loading oil source, and performing static loading on the model sample according to a set static load value, wherein when instantaneous pressure in the static loading oil line is increased, pressure energy can be stored in a first energy accumulator in the form of compression energy; and when the instantaneous pressure in the static loading oil line is reduced, the compression energy in the first energy accumulator can be supplemented to the static loading oil line to guarantee that the pressure in the static loading oil line is stable;

Step 4: monitoring a displacement data of a piston rod of a reaction hydraulic cylinder in the single actuator through a magnetostrictive displacement sensor in real time in a static loading process, first feeding back the displacement data to a controller, then sending an oil supply signal to a first electro-hydraulic servo valve through the controller, dynamically adjusting oil supply quantity of a reaction hydraulic cylinder in real time through the first electro-hydraulic servo valve, and finally enabling an actual displacement loading rate to conform to a set value; and Step 5: completing an overload test of the model sample under the multi-surface multi-point cooperative displacement control mode.

* * * * *